(12) United States Patent
Nakakura

(10) Patent No.: US 9,586,646 B2
(45) Date of Patent: Mar. 7, 2017

(54) BICYCLE RIM BRAKE

(71) Applicant: SHIMANO INC., Sakai (JP)

(72) Inventor: Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/663,469

(22) Filed: Mar. 20, 2015

(65) Prior Publication Data

US 2016/0272275 A1    Sep. 22, 2016

(51) Int. Cl.

| B62L 1/14 | (2006.01) |
| B62L 3/02 | (2006.01) |
| B60T 1/06 | (2006.01) |
| B60T 11/04 | (2006.01) |
| F16D 55/224 | (2006.01) |
| F16D 65/18 | (2006.01) |
| F16D 125/30 | (2012.01) |
| B62L 1/12 | (2006.01) |
| B62L 1/16 | (2006.01) |
| F16D 125/60 | (2012.01) |

(52) U.S. Cl.
CPC *B62L 1/14* (2013.01); *B60T 1/06* (2013.01); *B60T 11/046* (2013.01); *B62L 3/02* (2013.01); *F16D 55/2245* (2013.01); *F16D 65/183* (2013.01); *B62L 1/12* (2013.01); *B62L 1/16* (2013.01); *F16D 2125/30* (2013.01); *F16D 2125/60* (2013.01)

(58) Field of Classification Search
CPC ...... B62L 1/14; B62L 1/16; B62L 1/06; B62L 1/12; F16D 2125/30; F16D 2125/60

USPC ............. 188/24.12, 24.19, 24.21, 24.22
See application file for complete search history.

(56) References Cited

U.S. PATENT DOCUMENTS

| 4,391,352 A * | 7/1983 | Brown | B62L 1/12 |
| | | | 188/24.12 |
| 4,765,443 A * | 8/1988 | Cunningham | B62L 3/00 |
| | | | 188/24.12 |
| 4,869,351 A * | 9/1989 | Romano | B62L 1/16 |
| | | | 188/2 D |
| 4,938,318 A * | 7/1990 | Ishibashi | B62L 1/16 |
| | | | 188/196 M |
| 5,299,664 A * | 4/1994 | Peters | B62L 1/16 |
| | | | 188/24.15 |
| 5,626,209 A * | 5/1997 | Viola | B62L 1/16 |
| | | | 188/24.14 |

(Continued)

FOREIGN PATENT DOCUMENTS

EP    2551178    1/2013

*Primary Examiner* — Thomas Irvin
(74) *Attorney, Agent, or Firm* — Mori & Ward, LLP

(57) ABSTRACT

A bicycle rim brake comprises a first brake arm, a second brake arm, and a pivotal cam member. The first brake arm is configured to pivot about a first pivot axis. The first brake arm includes a first mounting portion and a first follower. The second brake arm is configured to pivot about a second pivot axis which is different from the first pivot axis. The second brake arm includes a second mounting portion and a second follower. The pivotal cam member is configured to pivot about a third pivot axis which is different from the first pivot axis and the second pivot axis to guide the first follower and the second follower so that the first brake arm pivots about the first pivot axis and the second brake arm pivots about the second pivot axis.

26 Claims, 8 Drawing Sheets

(56) References Cited

U.S. PATENT DOCUMENTS

| | | | |
|---|---|---|---|
| 5,803,207 A * | 9/1998 | Nielsen | B62L 1/16 188/24.12 |
| 5,913,388 A * | 6/1999 | Ota | B62L 1/14 188/24.12 |
| 6,945,368 B2 * | 9/2005 | Peyre | B60T 1/06 188/2 D |
| 7,537,094 B1 * | 5/2009 | Kato | B62L 1/10 188/2 D |
| 9,233,731 B1 * | 1/2016 | Nago | B62L 1/12 |
| 2013/0187358 A1 | 7/2013 | Kohl et al. | |
| 2014/0041971 A1 | 2/2014 | Hujer | |
| 2014/0262631 A1 | 9/2014 | Cobb | |

\* cited by examiner

BICYCLE RIM BRAKE

BACKGROUND OF THE INVENTION

Field of the Invention

The present invention relates to a bicycle rim brake.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle rim brake.

SUMMARY OF THE INVENTION

In accordance with a first aspect of the present invention, a bicycle rim brake comprises a first brake arm, a second brake arm, and a pivotal cam member. The first brake arm is configured to pivot about a first pivot axis. The first brake arm includes a first mounting portion to which a first friction member is to be mounted, and a first follower arranged apart from the first mounting portion. The second brake arm is configured to pivot about a second pivot axis which is different from the first pivot axis. The second brake arm includes a second mounting portion to which a second friction member is to be mounted, and a second follower arranged apart from the second mounting portion. The pivotal cam member is configured to pivot about a third pivot axis which is different from the first pivot axis and the second pivot axis to guide the first follower and the second follower so that the first brake arm pivots about the first pivot axis and the second brake arm pivots about the second pivot axis.

With the bicycle rim brake according to the first aspect, the pivotal cam member is configured to pivot about the third pivot axis which is different from the first pivot axis and the second pivot axis to guide the first follower and the second follower so that the first brake arm pivots about the first pivot axis and the second brake arm pivots about the second pivot axis. Thus, it is possible to convert the pivotal movement of the pivotal cam member into the pivotal movement of the first brake arm and the pivotal movement of the second brake arm. Accordingly, it is possible to reduce a size of the bicycle rim brake corn and/or expand the possibility of design of the bicycle rim brake compared with, for example, a comparative rim brake including a structure configured to convert a linear movement of a cam member into pivotal movements of brake arms.

In accordance with a second aspect of the present invention, the bicycle rim brake according to the first aspect is configured so that the pivotal cam member includes a first cam surface configured to guide the first follower, and a second cam surface configured to guide the second follower.

With the bicycle rim brake according to the second aspect, it is possible to reduce a size of the pivotal cam member by modifying the first cam surface and the second cam surface. This can further reduce the size of the bicycle rim brake and/or can further expand the possibility of design of the bicycle rim brake.

In accordance with a third aspect of the present invention, the bicycle rim brake according to the second aspect is configured so that the first cam surface is provided on an opposite side of the second cam surface relative to the third pivot axis.

With the bicycle rim brake according to the third aspect, both sides of the pivotal cam member can be utilized as cam surfaces, allowing the size of the pivotal cam member to be further reduced. Accordingly, it is possible to further reduce the size of the bicycle rim brake and/or to further expand the possibility of design of the bicycle rim brake.

In accordance with a fourth aspect of the present invention, the bicycle rim brake according to the second or third aspect is configured so that the first cam surface has a profile different from a profile of the second cam surface.

With the bicycle rim brake according to the fourth aspect, it is possible to arrange the third pivot axis at various positions relative to the first follower and the second follower. Accordingly, it is possible to further reduce the size of the bicycle rim brake and/or to further expand the possibility of design of the bicycle rim brake.

In accordance with a fifth aspect of the present invention, the bicycle rim brake according to any one of the first to fourth aspects is configured so that the pivotal cam member is provided between the first follower and the second follower.

With the bicycle rim brake according to the fifth aspect, it is possible to utilize a space between the first follower and the second follower. Accordingly, it is possible to further reduce the size of the bicycle rim brake and/or to further expand the possibility of design of the bicycle rim brake.

In accordance with a sixth aspect of the present invention, the bicycle rim brake according to any one of the first to fifth aspects is configured so that the third pivot axis is provided between the first follower and the second follower.

With the bicycle rim brake according to the sixth aspect, it is possible to utilize a space between the first follower and the second follower. Accordingly, it is possible to further reduce the size of the bicycle rim brake and/or to further expand the possibility of design of the bicycle rim brake.

In accordance with a seventh aspect of the present invention, the bicycle rim brake according to any one of the first to sixth aspects is configured so that the third pivot axis is provided in an area defined between the first pivot axis and the second pivot axis.

With the bicycle rim brake according to the seventh aspect, it is possible to utilize the area defined between the first pivot axis and the second pivot axis. Accordingly, it is possible to further reduce the size of the bicycle rim brake and/or to further expand the possibility of design of the bicycle rim brake.

In accordance with an eighth aspect of the present invention, the bicycle rim brake according to any one of the first to seventh aspects is configured so that the first follower is rotatable about a first rotational axis, and the second follower is rotatable about a second rotational axis.

With the bicycle rim brake according to the eighth aspect, since the first follower is rotatable about the first rotational axis, it is possible to make a relative movement between the first follower and the pivotal cam member smooth. Since the second follower is rotatable about the second rotational axis, it is possible to make a relative movement between the second follower and the pivotal cam member smooth. These can make a braking operation of the bicycle rim brake smooth.

In accordance with a ninth aspect of the present invention, the bicycle rim brake according to any one of the first to eighth aspects is configured so that the first follower is provided on an opposite side of the first mounting portion relative to the first pivot axis. The second follower is provided on an opposite side of the second mounting portion relative to the second pivot axis.

With the bicycle rim brake according to the ninth aspect, it is possible to utilize a space around the opposite side of the first mounting portion in the first brake arm. Similarly, it is possible to utilize a space around the opposite side of the second mounting portion in the second brake arm. Accordingly, it is possible to further reduce the size of the bicycle rim brake and/or to further expand the possibility of design of the bicycle rim brake.

In accordance with a tenth aspect of the present invention, the bicycle rim brake according to any one of the first to ninth aspects further comprises a base member to which the first brake arm is pivotally mounted about the first pivot axis and to which the second brake arm is pivotally mounted about the second pivot axis.

With the bicycle rim brake according to the tenth aspect, it is possible to deal with the bicycle rim brake as a single component.

In accordance with an eleventh aspect of the present invention, the bicycle rim brake according to any one of the first to tenth aspects further comprises an intermediate member via which an operating force is to be transmitted to the pivotal cam member.

With the bicycle rim brake according to the eleventh aspect, it is possible to transmit the operating force to the pivotal cam member via a simple structure.

In accordance with a twelfth aspect of the present invention, the bicycle rim brake according to the eleventh aspect is configured so that the intermediate member is configured to be coupled to the pivotal cam member to pivot together with the pivotal cam member about the third pivot axis.

With the bicycle rim brake according to the twelfth aspect, it is possible to transmit the operating force to the pivotal cam member by pivoting the intermediate member.

In accordance with a thirteenth aspect of the present invention, the bicycle rim brake according to the eleventh or twelfth aspect is configured so that the intermediate member includes a cable attachment portion to which a control cable is to be attached.

With the bicycle rim brake according to the thirteenth aspect, it is possible to operate the bicycle rim brake via the control cable.

In accordance with a fourteenth aspect of the present invention, the bicycle rim brake according to the eleventh or twelfth aspect further comprises a hydraulic cylinder including a cylinder bore, and a piston movably provided in the cylinder bore. The piston is configured to be coupled to the intermediate member.

With the bicycle rim brake according to the fourteenth aspect, it is possible to operate the bicycle rim brake via a hydraulic fluid.

In accordance with a fifteenth aspect of the present invention, the bicycle rim brake according to any one of the first to fourteenth aspects further comprises a first coupling member and a second coupling member. The first coupling member is configured to couple the first brake arm to a bicycle frame to pivot relative to the bicycle frame about the first pivot axis. The second coupling member is configured to couple the second brake arm to the bicycle frame to pivot relative to the bicycle frame about the second pivot axis.

With the bicycle rim brake according to the fifteenth aspect, it is possible to easily mount the bicycle rim brake to the bicycle frame.

In accordance with a sixteenth aspect of the present invention, the bicycle rim brake according to any one of the first to fifteenth aspects is configured so that the first brake arm includes a first base part, a first arm body, and a first adjuster. The first follower is attached to the first base part. The first arm body includes the first mounting portion and is coupled to the first base part to pivot relative to the first base part about the first pivot axis. The first adjuster is configured to adjust an orientation of the first arm body relative to the first base part about the first pivot axis.

With the bicycle rim brake according to the sixteenth aspect, it is possible to easily adjust a clearance between the first friction member and a bicycle rim of a bicycle wheel in a rest state where the first friction member is positioned at a rest position.

In accordance with a seventeenth aspect of the present invention, the bicycle rim brake according to the sixteenth aspect is configured so that the second brake arm includes a second base part, a second arm body, and a second adjuster. The second follower is attached to the second base part. The second arm body includes the second mounting portion and is coupled to the second base part to pivot relative to the second base part about the second pivot axis. The second adjuster is configured to adjust an orientation of the second arm body relative to the second base part about the second pivot axis.

With the bicycle rim brake according to the seventeenth aspect, it is possible to easily adjust a clearance between the first friction member and a bicycle rim of a bicycle wheel in a rest state where the second friction member is positioned at a rest position.

In accordance with an eighteenth aspect of the present invention, the bicycle rim brake according to the seventeenth aspect further comprises an arm biasing member configured to apply a biasing force to the first arm body and the second arm body so that the first mounting portion and the second mounting portion move away from each other.

With the bicycle rim brake according to the eighteenth aspect, it is possible to position the first brake arm at a first rest position and to position the second brake arm at a second rest position.

In accordance with a nineteenth aspect of the present invention, the bicycle rim brake according to any one of the first to seventeenth aspects further comprises an arm biasing member configured to apply a biasing force to the first brake arm and the second brake arm so that the first mounting portion and the second mounting portion move away from each other.

With the bicycle rim brake according to the nineteenth aspect, it is possible to position the first brake arm at a first rest position and to position the second brake arm at a second rest position.

In accordance with a twentieth aspect of the present invention, a bicycle rim brake comprises a first brake arm, a second brake arm, and a pivotal operating member. The first brake arm is configured to pivot about a first pivot axis and includes a first mounting portion to which a first friction member is to be mounted. The second brake arm is configured to pivot about a second pivot axis which is different from the first pivot axis. The second brake arm includes a second mounting portion to which a second friction member is to be mounted. The pivotal operating member is configured to pivot about a third pivot axis which is different from the first pivot axis and the second pivot axis so that the first brake arm pivots about the first pivot axis and the second brake arm pivots about the second pivot axis. The third pivot axis is provided in an area defined between the first pivot axis and the second pivot axis.

With the bicycle rim brake according to the twentieth aspect, the pivotal operating member is configured to pivot about the third pivot axis which is different from the first pivot axis and the second pivot axis so that the first brake arm pivots about the first pivot axis and the second brake arm pivots about the second pivot axis. The third pivot axis is provided in an area defined between the first pivot axis and the second pivot axis. Accordingly, it is possible to utilize the area defined between the first pivot axis and the second pivot axis. Thus, it is possible to reduce the size of the bicycle rim brake and/or to further expand the possibility of design of the bicycle rim brake.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
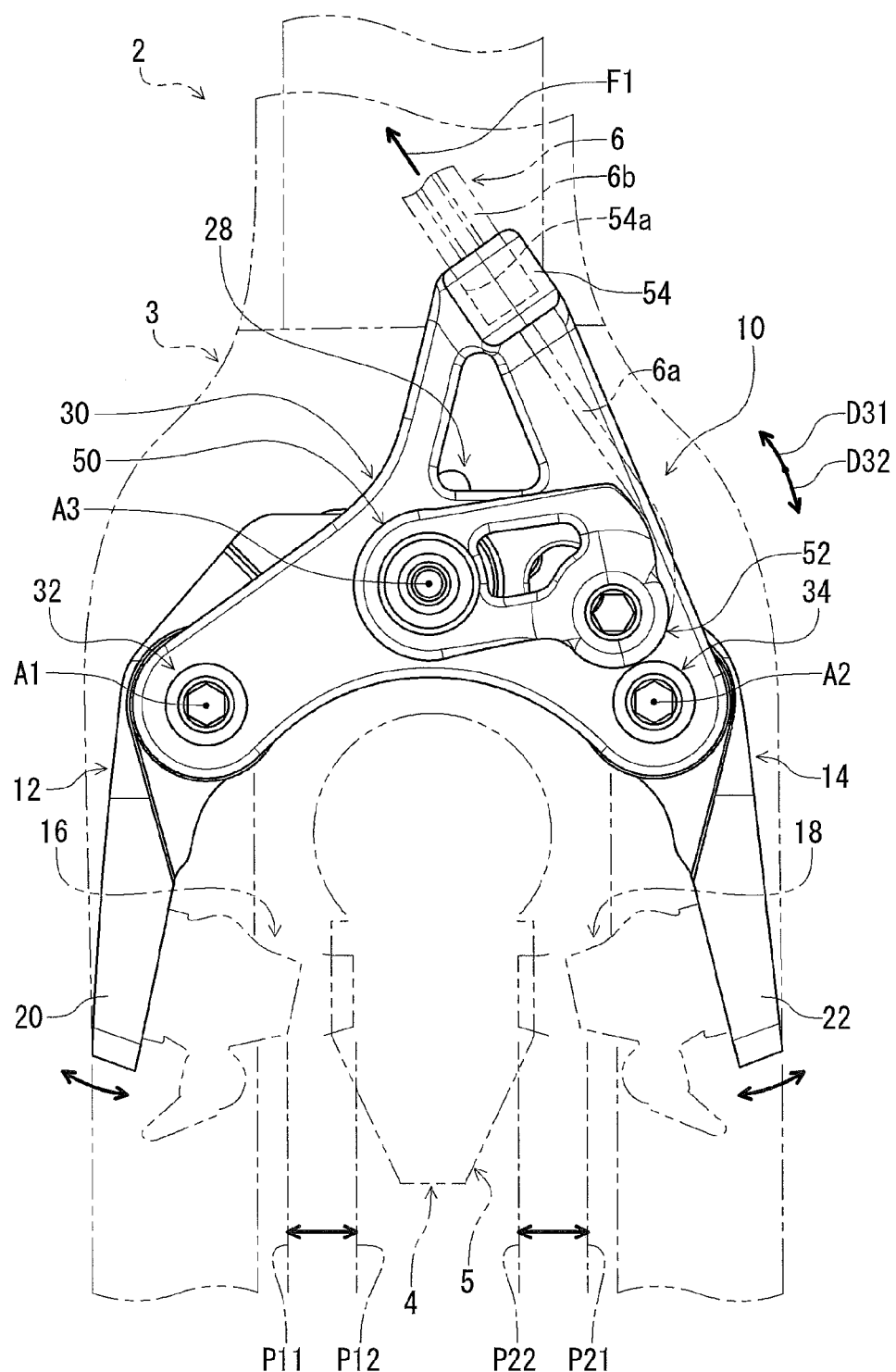
FIG. 1 is an elevational view of a bicycle frame equipped with a bicycle rim brake in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle rim brake 10 in accordance with a first embodiment is configured to be mounted to a bicycle frame 2. The bicycle rim brake 10 is mounted to a front fork 3 of the bicycle frame 2 and is configured to apply a braking force to a bicycle wheel 4 rotatably attached to the front fork 3. While the bicycle rim brake 10 is a front rim brake in the illustrated embodiment, structures of the bicycle rim brake 10 can be applied to a rear rim brake if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rim brake 10, should be interpreted relative to the bicycle equipped with the bicycle rim brake 10 as used in an upright riding position on a horizontal surface.

Figure 2:
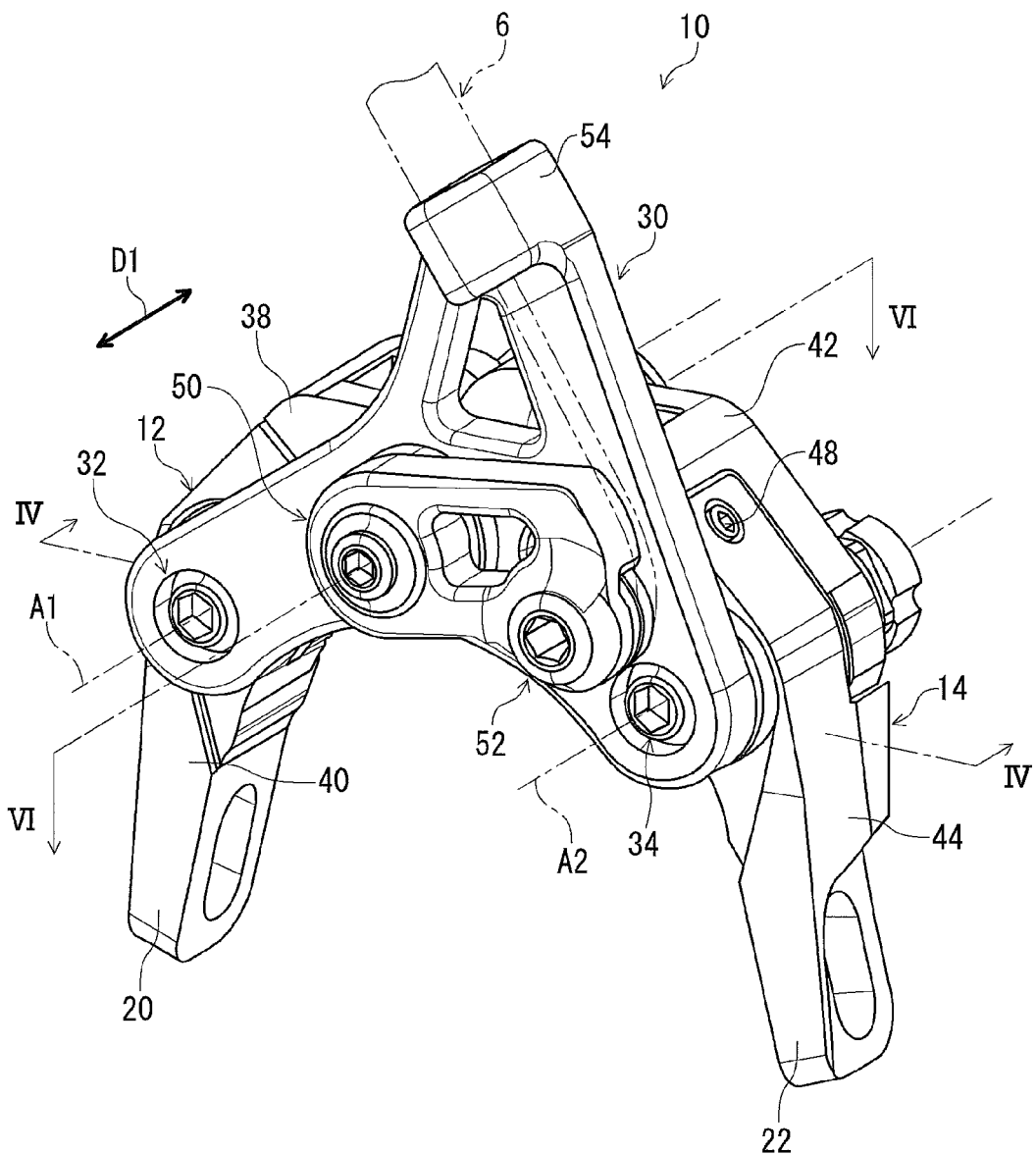
FIG. 2 is a perspective view of the bicycle rim brake illustrated in FIG. 1.
Figure 3:
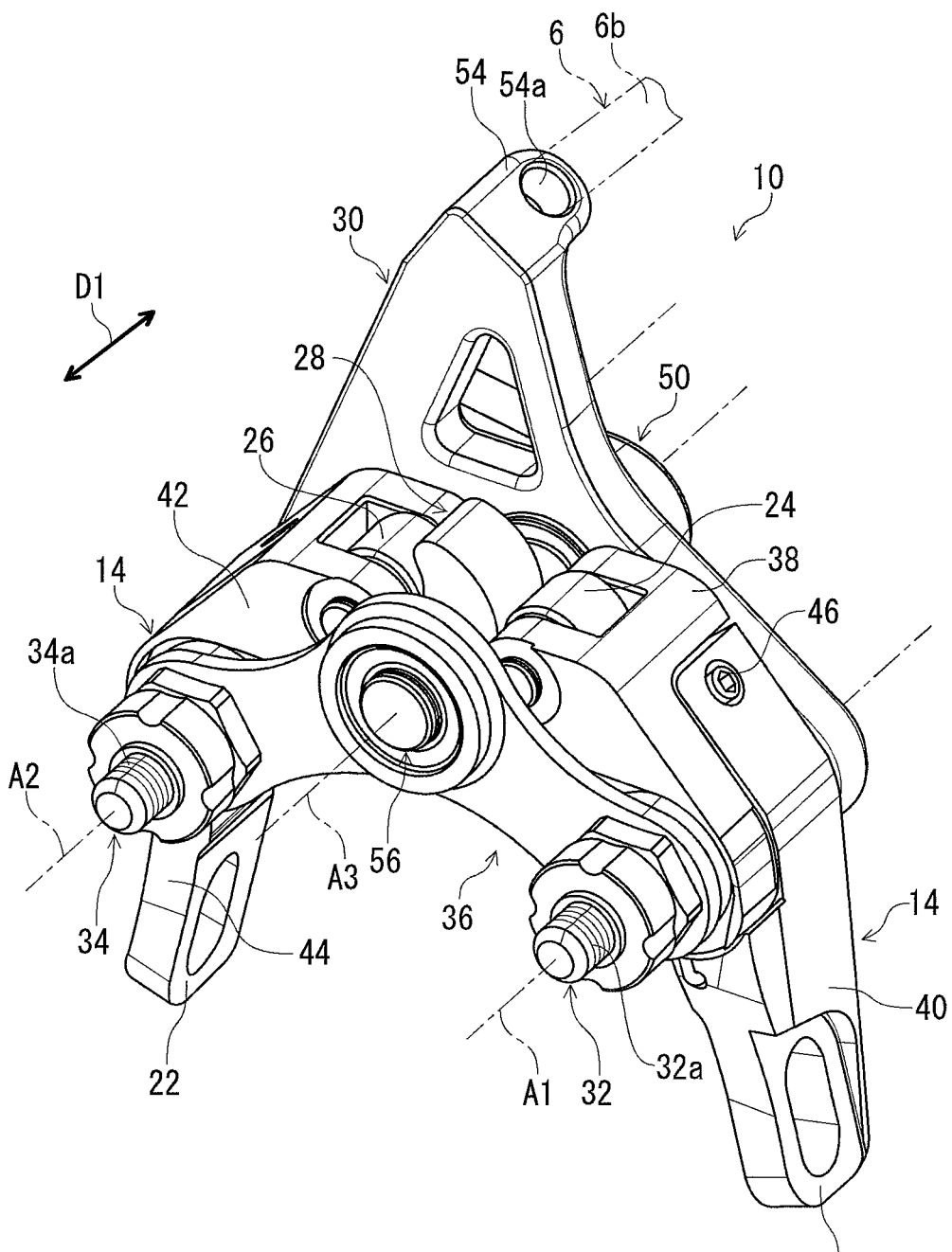
FIG. 3 is another perspective view of the bicycle rim brake illustrated in FIG. 1.

As seen in FIGS. 1 to 3, the bicycle rim brake 10 comprises a first brake arm 12 and a second brake arm 14. The first brake arm 12 is configured to pivot about a first pivot axis A1. The second brake arm 14 is configured to pivot about a second pivot axis A2 which is different from the first pivot axis A1. In the illustrated embodiment, the first pivot axis A1 is parallel to the second pivot axis A2.

As seen in FIG. 1, the bicycle rim brake 10 further comprises a first friction member 16 and a second friction member 18. The first friction member 16 is mounted to the first brake arm 12 to be contact with a bicycle rim 5 of the bicycle wheel 4. The second friction member 18 is mounted to the second brake arm 14 to be contact with the bicycle rim 5 of the bicycle wheel 4. Specifically, the first brake arm 12 includes a first mounting portion 20 to which the first friction member 16 is to be mounted. The second brake arm 14 includes a second mounting portion 22 to which the second friction member 18 is to be mounted.

As seen in FIG. 3, the first brake arm 12 includes a first follower 24 arranged apart from the first mounting portion 20. The second brake arm 14 includes a second follower 26 arranged apart from the second mounting portion 22. In the illustrated embodiment, the first follower 24 is opposite to the first mounting portion 20 in the first brake arm 12. The second follower 26 is opposite to the second mounting portion 22 in the second brake arm 14.

As seen in FIG. 3, the bicycle rim brake 10 comprises a pivotal cam member 28. The pivotal cam member 28 can also be referred to as a pivotal operating member 28. The pivotal operating member 28 is configured to pivot about a third pivot axis A3 so that the first brake arm 12 pivots about the first pivot axis A1 and the second brake arm 14 pivots about the second pivot axis A2. The pivotal cam member 28 is configured to pivot about the third pivot axis A3 to guide the first follower 24 and the second follower 26 so that the first brake arm 12 pivots about the first pivot axis A1 and the second brake arm 14 pivots about the second pivot axis A2. The third pivot axis A3 is different from the first pivot axis A1 and the second pivot axis A2. While the third pivot axis A3 is parallel to the first pivot axis A1 and the second pivot axis A2 in the illustrated embodiment, the third pivot axis A3 can be non-parallel to the first pivot axis A1 and the second pivot axis A2.

As seen in FIG. 1, the pivotal cam member 28 is configured to pivot about the third pivot axis A3 to pivot the first brake arm 12 about the first pivot axis A1 so that the first friction member 16 moves between a first rest position P11 and a first operated position P12. The pivotal cam member 28 is configured to pivot about the third pivot axis A3 to pivot the second brake arm 14 about the second pivot axis A2 so that the second friction member 18 moves between a second rest position P21 and a second operated position P22.

Figure 4:
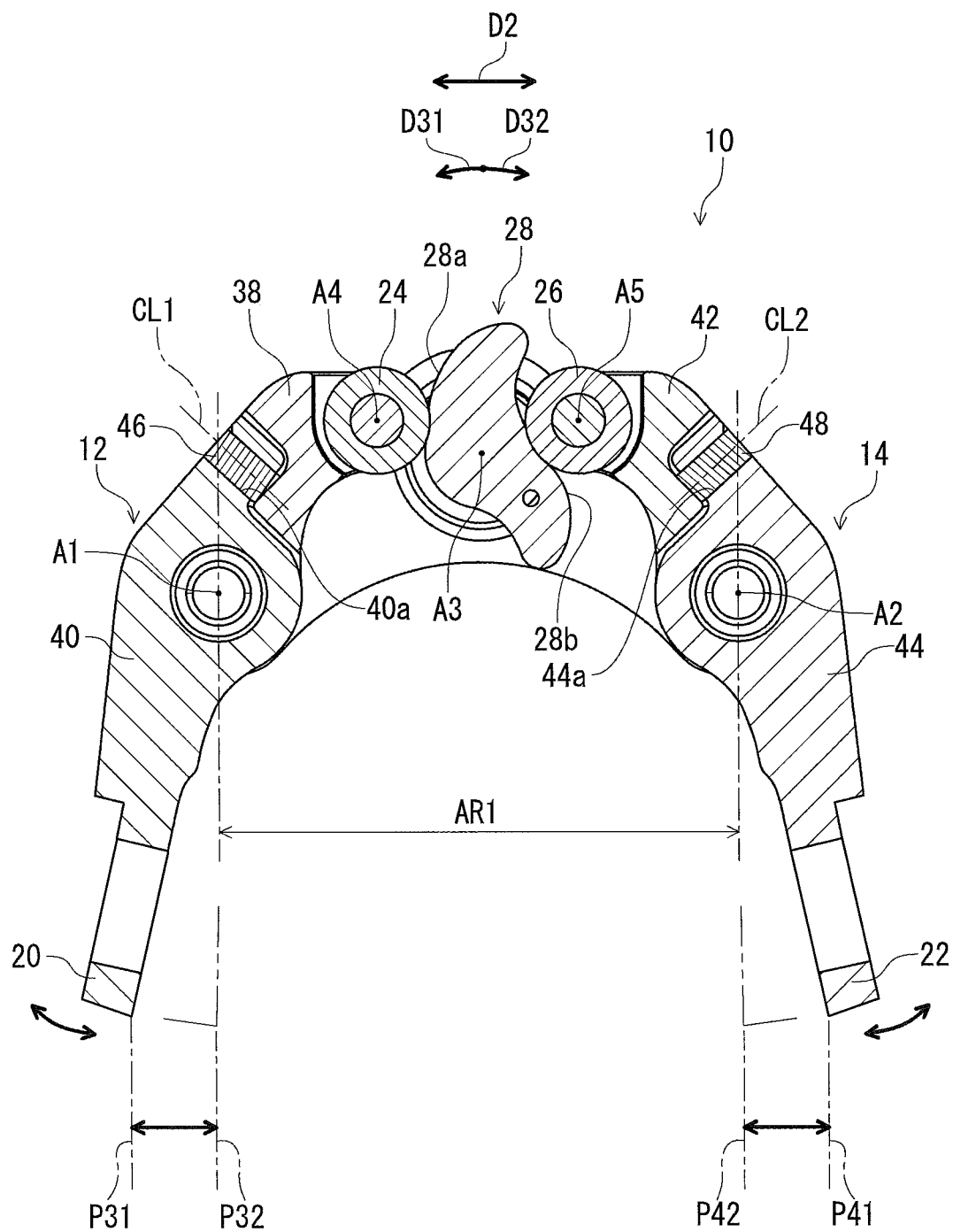
FIG. 4 is a cross-sectional view of the bicycle rim brake taken along line IV-IV of FIG. 2.

As seen in FIG. 4, the pivotal cam member 28 is configured to pivot about the third pivot axis A3 to guide the first follower 24 so that the first brake arm 12 pivots about the first pivot axis A1 between a first rest position P31 and a first operated position P32. The pivotal cam member 28 is configured to pivot about the third pivot axis A3 to guide the second follower 26 so that the second brake arm 14 pivots about the second pivot axis A2 between a second rest position P41 and a second operated position P42. The first rest position P31 of the first brake arm 12 corresponds to the first rest position P11 (FIG. 1) of the first friction member 16. The first operated position P32 of the first brake arm 12 corresponds to the first operated position P12 (FIG. 1) of the first friction member 16. The second rest position P41 of the second brake arm 14 corresponds to the second rest position P21 (FIG. 1) of the second friction member 18. The second operated position P42 of the second brake arm 14 corresponds to the second operated position P22 (FIG. 1) of the second friction member 18.

In the present application, the term "rest position" as used herein refers to a position at which a movable part such as the first brake arm 12, the second brake arm 14, the first friction member 16 and the second friction member 18 remains stationary in a state where the movable part is not operated by the user. The term "operated position" as used herein refers to a position at which the movable part has been operated by the user to perform the operation of the bicycle component.

As seen in FIGS. 1 to 3, the bicycle rim brake 10 further comprises a base member 30 to which the first brake arm 12 is pivotally mounted about the first pivot axis A1 and to which the second brake arm 14 is pivotally mounted about the second pivot axis A2. Since the bicycle rim brake 10 further comprises the base member 30, it is possible to deal with the bicycle rim brake 10 as a single component. However, the base member 30 can be omitted from the bicycle rim brake 10 if needed and/or desired.

As seen in FIGS. 2 and 3, the bicycle rim brake 10 further comprises a first coupling member 32 and a second coupling member 34. The first coupling member 32 is configured to couple the first brake arm 12 to the bicycle frame 2 (FIG. 1) to pivot relative to the bicycle frame 2 (FIG. 1) about the first pivot axis A1. The second coupling member 34 is configured to couple the second brake arm 14 to the bicycle frame 2 (FIG. 1) to pivot relative to the bicycle frame 2 (FIG. 1) about the second pivot axis A2. Since the bicycle rim brake 10 includes the first coupling member 32 and the second coupling member 34, it is possible to easily mount the bicycle rim brake 10 to the bicycle frame 2. However, at least one of the first coupling member 32 and the second coupling member 34 can be omitted from the bicycle rim brake 10 if needed and/or desired.

In the illustrated embodiment, the first coupling member 32 couples the first brake arm 12 to the base member 30 to pivot relative to the base member 30 about the first pivot axis A1. The second coupling member 34 couples the second brake arm 14 to the base member 30 to pivot relative to the base member 30 about the second pivot axis A3.

As seen in FIG. 3, the first coupling member 32 includes a first threaded part 32a. The second coupling member 34 includes a second threaded part 34a. The first threaded part 32a is threadedly engaged with a first brake mount part (not shown) of the front fork 3 (FIG. 1). The second threaded part 34a is threadedly engaged with a second brake mount part (not shown) of the front fork 3 (FIG. 1).

As seen in FIG. 3, the bicycle rim brake 10 further comprises an additional base member 36 to which the first brake arm 12 is pivotally mounted about the first pivot axis A1 and to which the second brake arm 14 is pivotally mounted about the second pivot axis A2. In the illustrated embodiment, the first coupling member 32 couples the first brake arm 12 to the base member 30 and the additional base member 36 to pivot relative to the base member 30 about the first pivot axis A1. The second coupling member 34 couples the second brake arm 14 to the base member 30 and the additional base member 36 to pivot relative to the base member 30 about the second pivot axis A3. The first brake arm 12 is provided between the base member 30 and the additional base member 36 in an axial direction D1 parallel to the first pivot axis A1. The second brake arm 14 is provided between the base member 30 and the additional base member 36 in the axial direction D1. The first follower 24, the second follower 26, and the pivot cam member 28 are provided between the base member 30 and the additional base member 36 in the axial direction D1. The additional base member 36 can be omitted from the bicycle rim brake 10 if needed and/or desired.

As seen in FIG. 4, the pivotal cam member 28 includes a first cam surface 28a and a second cam surface 28b. The first cam surface 28a is configured to guide the first follower 24. The second cam surface 28b is configured to guide the second follower 26. The first cam surface 28a has a curved shape and is in contact with the first follower 24. The second cam surface 28b has a curved shape and is in contact with the second follower 26. Since the pivotal cam member 28 includes the first cam surface 28a and the second cam surface 28b, it is possible to reduce a size of the pivotal cam member 28 by modifying the first cam surface 28a and the second cam surface 28b. This can further reduce the size of the bicycle rim brake 10 and/or can further expand the possibility of design of the bicycle rim brake 10.

In the illustrated embodiment, as seen in FIG. 4, the first cam surface 28a is provided on an opposite side of the second cam surface 28b relative to the third pivot axis A3. The third pivot axis A3 is provided between the first cam surface 28a and the second cam surface 28b. Accordingly, both sides of the pivotal cam member 28 can be utilized as cam surfaces, allowing the size of the pivotal cam member 28 to be further reduced. Accordingly, it is possible to further reduce the size of the bicycle rim brake 10 and/or to further expand the possibility of design of the bicycle rim brake 10. However, the arrangements of the first cam surface 28a and the second cam surface 28b are not limited to the illustrated embodiment.

As seen in FIG. 4, the first cam surface 28a has a profile different from a profile of the second cam surface 28b. Thus, it is possible to arrange the third pivot axis A3 at various positions relative to the first follower 24 and the second follower 26. Accordingly, it is possible to further reduce the size of the bicycle rim brake 10 and/or to further expand the possibility of design of the bicycle rim brake 10. However, the profile of the first cam surface 28a can be equal to the profile of the second cam surface 28b if needed and/or desired.

As seen in FIG. 4, the pivotal cam member 28 is provided between the first follower 24 and the second follower 26. The third pivot axis A3 is provided between the first follower 24 and the second follower 26. Thus, it is possible to utilize a space between the first follower 24 and the second follower 26. Accordingly, it is possible to further reduce the size of the bicycle rim brake 10 and/or to further expand the possibility of design of the bicycle rim brake 10. However, the arrangements of the pivotal cam member 28 and the third pivot axis A3 are not limited to the illustrated embodiment.

As seen in FIG. 4, the third pivot axis A3 is provided in an area AR1 defined between the first pivot axis A1 and the second pivot axis A2. Specifically, the first pivot axis A1 is spaced apart from the second pivot axis A2 in a transverse direction D2. The area AR1 is defined between the first pivot axis A1 and the second pivot axis A2 in the transverse direction D2. Since the third pivot axis A3 is provided in an area AR1 defined between the first pivot axis A1 and the second pivot axis A2, it is possible to utilize the area defined between the first pivot axis A1 and the second pivot axis A2. Accordingly, it is possible to further reduce the size of the bicycle rim brake 10 and/or to further expand the possibility of design of the bicycle rim brake 10. However, the arrangement of the third pivot axis A3 is not limited to the illustrated embodiment.

As seen in FIG. 4, the first follower 24 is rotatable about a first rotational axis A4. The second follower 26 is rotatable about a second rotational axis A5. In the illustrated embodiment, the first rotational axis A4 is parallel to the second rotational axis A5. The first rotational axis A4 and the second rotational axis A5 are parallel to the first pivot axis A1, the second pivot axis A2, and the third pivot axis A3. The first follower 24 has a tubular shape. The second follower 26 has a tubular shape. Since the first follower 24 is rotatable about the first rotational axis A4, it is possible to make a relative movement between the first follower 24 and the pivotal cam member 28 smooth. Since the second follower 26 is rotatable about the second rotational axis A5, it is possible to make a relative movement between the second follower 26 and the pivotal cam member 28 smooth. These can make a braking operation of the bicycle rim brake 10 smooth.

As seen in FIG. 4, the first follower 24 is provided on an opposite side of the first mounting portion 20 relative to the first pivot axis A1. The first brake arm 12 includes a first base part 38 and a first arm body 40. The first follower 24 is attached to the first base part 38. The first follower 24 is rotatable relative to the first base part 38 about the first rotational axis A4. The first arm body 40 includes the first mounting portion 20 and is coupled to the first base part 38 to pivot relative to the first base part 38 about the first pivot axis A1.

As seen in FIG. 4, the second follower 26 is provided on an opposite side of the second mounting portion 22 relative to the second pivot axis A2. The second brake arm 14 includes a second base part 42 and a second arm body 44. The second follower 26 is attached to the second base part 42. The second follower 26 is rotatable relative to the second base part 42 about the second rotational axis A5. The second arm body 44 includes the second mounting portion 22 and is coupled to the second base part 42 to pivot relative to the second base part 42 about the second pivot axis A2.

Since the first follower 24 is provided on an opposite side of the first mounting portion 20 relative to the first pivot axis A1, it is possible to utilize a space around the opposite side of the first mounting portion 20 in the first brake arm 12. Similarly, since the second follower 26 is provided on an opposite side of the second mounting portion 22 relative to the second pivot axis A2, it is possible to utilize a space around the opposite side of the second mounting portion 22 in the second brake arm 14. Accordingly, it is possible to further reduce the size of the bicycle rim brake 10 and/or to further expand the possibility of design of the bicycle rim brake 10.

As seen in FIG. 4, the first brake arm 12 includes a first adjuster 46. The first adjuster 46 is configured to adjust an orientation of the first arm body 40 relative to the first base part 38 about the first pivot axis A1. In the illustrated embodiment, the first adjuster 46 comprises a screw. The first arm body 40 includes a first threaded hole 40a. The first adjuster 46 is threadedly engaged with the first threaded hole 40a. An end of the first adjuster 46 is contactable with the first base part 38.

Rotation of the first adjuster 46 relative to the first base part 38 changes a linear position of the first adjuster 46 relative to the first arm body 40 along a center line CL1 of the first threaded hole 40a. The change in the linear position of the first adjuster 46 relative to the first arm body 40 changes a pivotal position of the first arm body 40 relative to the first base part 38 about the first pivot axis A1. Thus, the orientation of the first arm body 40 is adjusted relative to the first base part 38 by using the first adjuster 46. Since the first brake arm 12 includes the first base part 38, the first arm body 40, and the first adjuster 46, it is possible to easily adjust a clearance between the first friction member 16 and the bicycle rim 5 of the bicycle wheel 4 in a rest state where the first friction member 16 is positioned at the first rest position P11 (FIG. 1).

As seen in FIG. 4, the second brake arm 14 includes a second adjuster 48. The second adjuster 48 is configured to adjust an orientation of the second arm body 44 relative to the second base part 42 about the second pivot axis A2. In the illustrated embodiment, the first adjuster 46 comprises a screw. The second arm body 44 includes a second threaded hole 44a. The second adjuster 48 is threadedly engaged with the second threaded hole 44a. An end of the second adjuster 48 is contactable with the second base part 42.

Rotation of the second adjuster 48 relative to the second base part 42 changes a linear position of the second adjuster 48 relative to the second arm body 44 along a center line CL2 of the second threaded hole 44a. The change in the linear position of the second adjuster 48 relative to the second arm body 44 changes a pivotal position of the second arm body 44 relative to the second base part 42 about the second pivot axis A2. Thus, the orientation of the second arm body 44 is adjusted relative to the second base part 42 by using the second adjuster 48. Since the second brake arm 14 includes the second base part 42, the second arm body 44, and the second adjuster 48, it is possible to easily adjust a clearance between the second friction member 18 and the bicycle rim 5 of the bicycle wheel 4 in a rest state where the second friction member 18 is positioned at the second rest position P21 (FIG. 1).

As seen in FIG. 1, the bicycle rim brake 10 further comprises an intermediate member 50 via which an operating force F1 is to be transmitted to the pivotal cam member 28. The intermediate member 50 is configured to be coupled to the pivotal cam member 28 to pivot together with the pivotal cam member 28 about the third pivot axis A3. In the illustrated embodiment, the intermediate member 50 includes a cable attachment portion 52 to which a control cable 6 is to be attached. Specifically, an end of an inner wire 6a of the control cable 6 is attached to the cable attachment portion 52. Possible examples of the control cable 6 includes a Bowden cable.

As seen in FIGS. 1 and 3, the base member 30 includes an outer-casing receiving portion 54 configured to receive an outer casing 6b of the control cable 6. The outer-casing receiving portion 54 includes a receiving hole 54a in which an end of the outer casing 6b is provided.

Since the bicycle rim brake 10 further comprises the intermediate member 50, it is possible to transmit the operating force F1 to the pivotal cam member 28 via a simple structure. Since the intermediate member 50 is configured to be coupled to the pivotal cam member 28 to pivot together with the pivotal cam member 28 about the third pivot axis A3, it is possible to transmit the operating force F1 to the pivotal cam member 28 by pivoting the intermediate member 50. Since the intermediate member 50 includes the cable attachment portion 52, it is possible to operate the bicycle rim brake 10 via the control cable 6.

Figure 5:
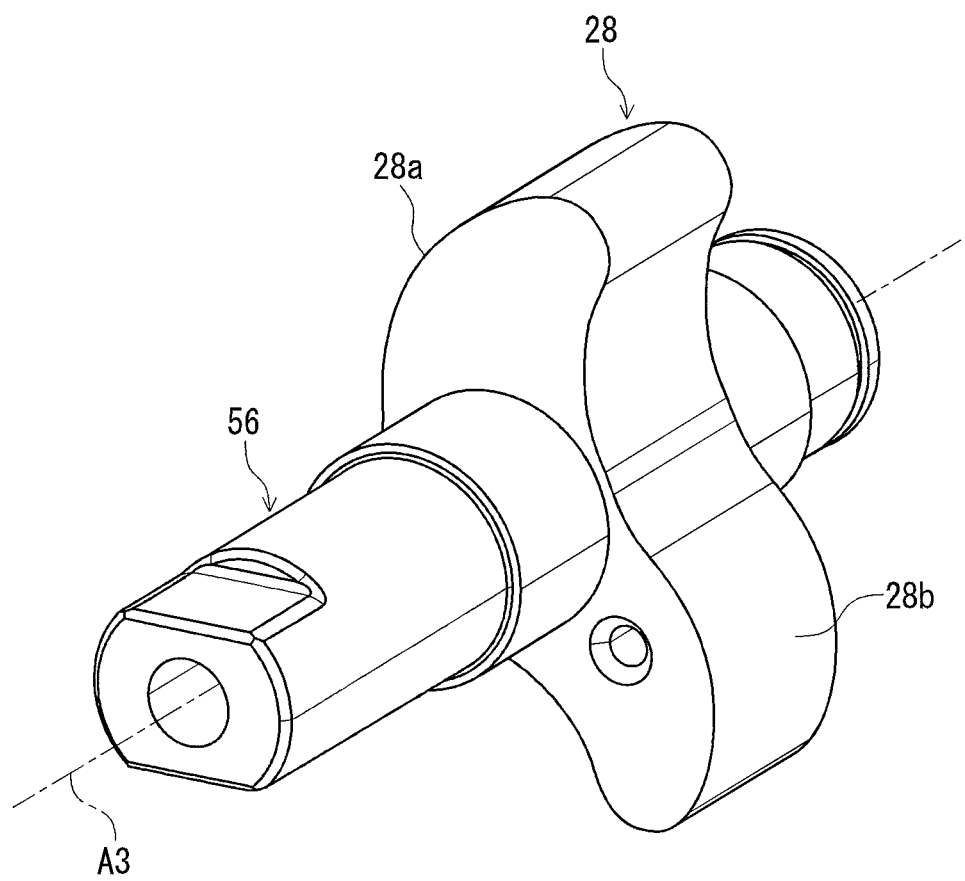
FIG. 5 is a perspective view of a pivotal cam member of the bicycle rim brake illustrated in FIG. 1.

As seen in FIG. 3, the bicycle rim brake 10 further comprises a pivot shaft 56 configured to pivotally support the pivotal cam member 28. As seen in FIG. 5, the pivot shaft 56 extends from the pivotal cam member 28 toward both sides relative to the pivotal cam member 28 along the third pivot axis A3. The pivot shaft 56 defines the third pivot axis A3. The pivot cam member 28 is integrally provided with the pivot shaft 56 as a single unitary member. However, the pivot cam member 28 can be a separate member from the pivot shaft 56.

Figure 6:
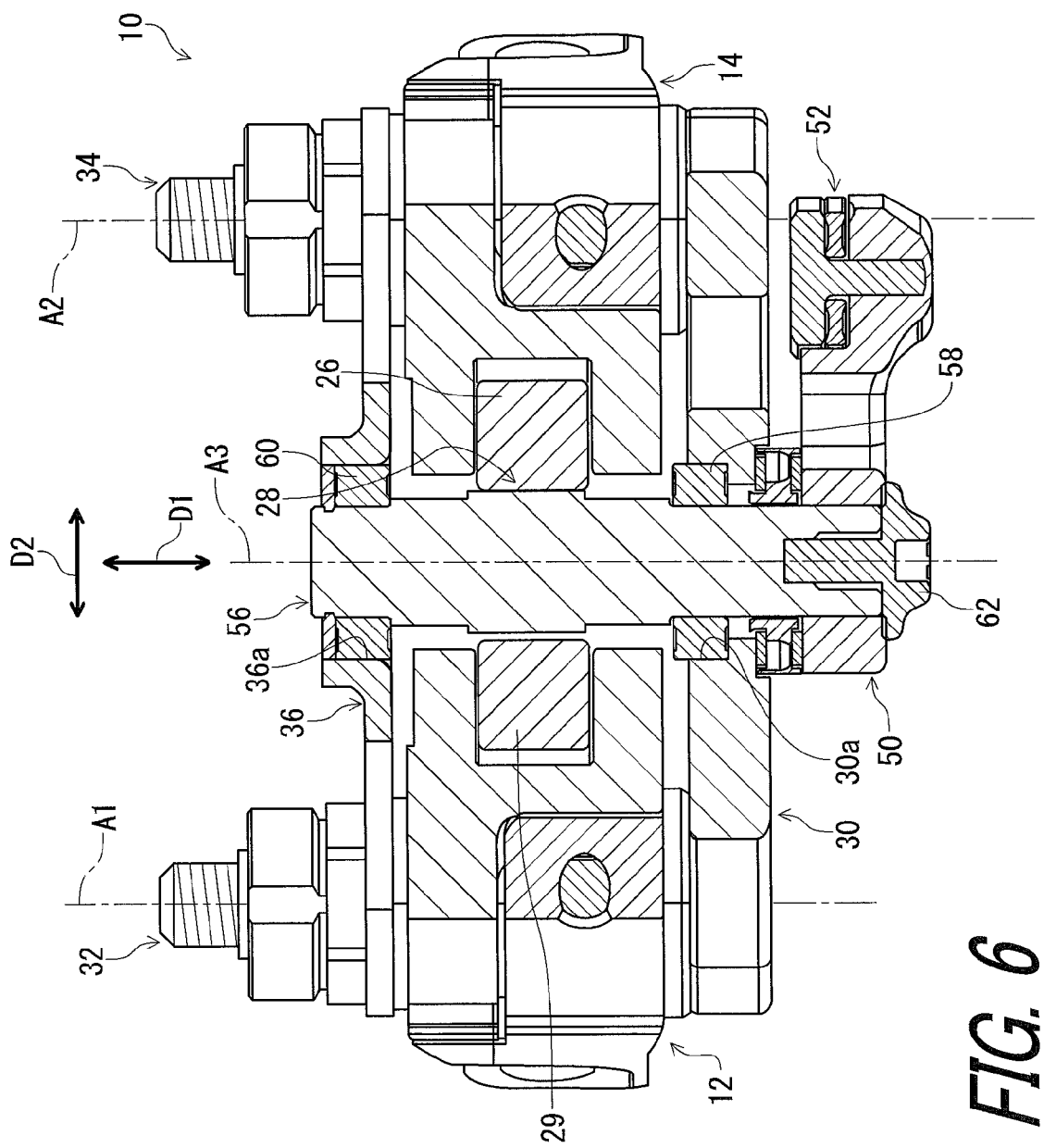
FIG. 6 is a cross-sectional view of the bicycle rim brake taken along line VI-VI of FIG. 2.

As seen in FIG. 6, the base member 30 includes a supporting hole 30a. The pivot shaft 56 extends through the supporting hole 30a in the axial direction D1. The additional base member 36 includes an additional supporting hole 36a. The pivot shaft 56 extends through the additional supporting hole 36a. The bicycle rim brake 10 further comprises a support ring 58 and an additional support ring 60. The support ring 58 is provided in the supporting hole 30a of the base member 30 and is provided between the pivot shaft 56 and the base member 30. The additional support ring 60 is provided in the additional supporting hole 36a of the additional base member 36 and is provided between the pivot shaft 56 and the additional base member 36. The pivot shaft 56 is pivotally mounted to the base member 30 and the additional base member 36 via the support ring 58 and the additional support ring 60.

The intermediate member 50 is configured to be coupled to the pivot shaft 56. The intermediate member 50 is configured to pivot relative to the base member 30 together with the pivotal cam member 28 and the pivot shaft 56 about the third pivot axis A3. The bicycle rim brake 10 further comprises a fastener 62 such as a screw. The intermediate member 50 is secured to the pivot shaft 56 via the fastener 62.

Figure 7:
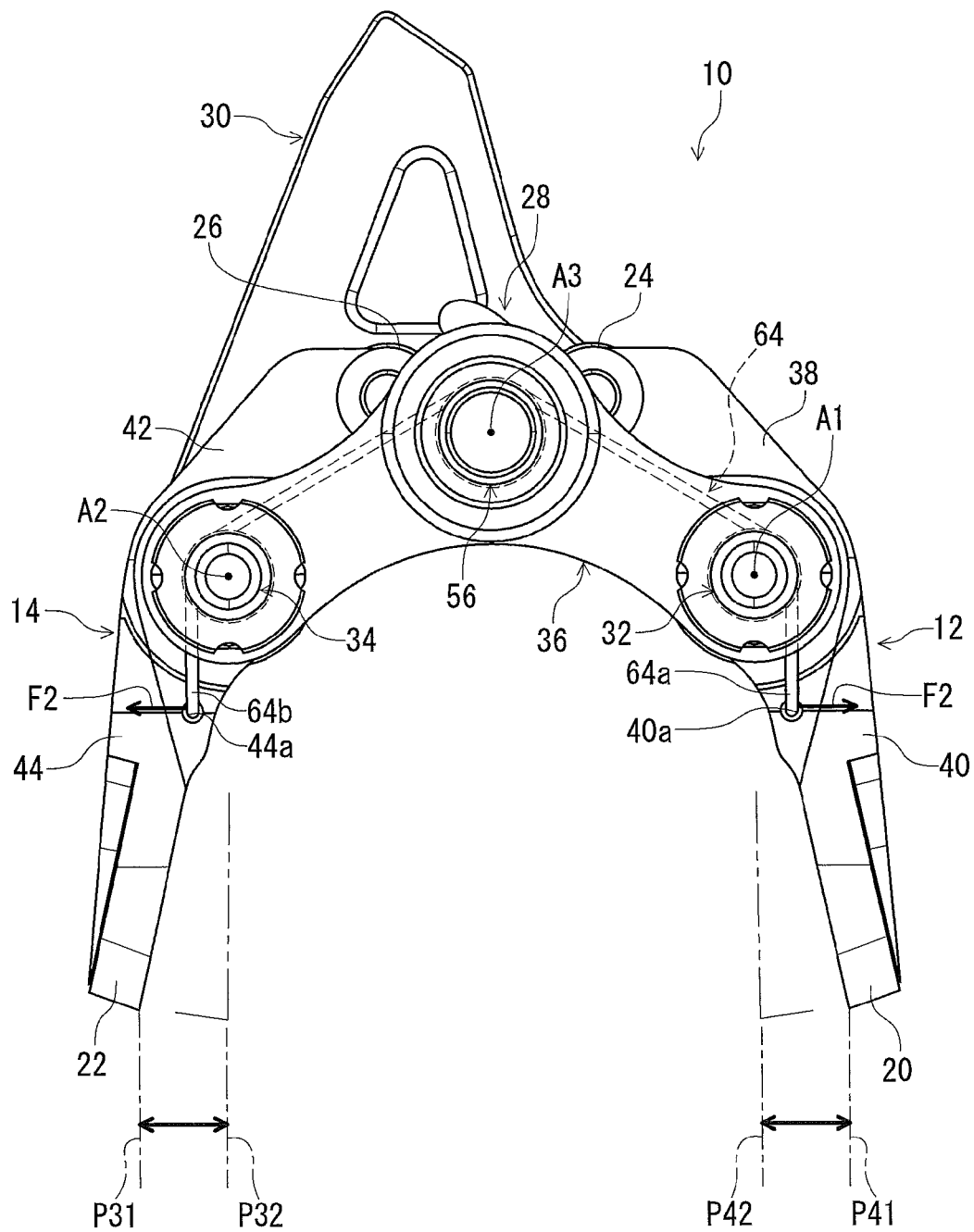
FIG. 7 is another elevational view of the bicycle rim brake illustrated in FIG. 1.

As seen in FIG. 7, the bicycle rim brake 10 further comprises an arm biasing member 64. The arm biasing member 64 is configured to apply a biasing force F2 to the first brake arm 12 and the second brake arm 14 so that the first mounting portion 20 and the second mounting portion 22 move away from each other. The arm biasing member 64 is configured to apply the biasing force F2 to the first arm body 40 and the second arm body 44 so that the first mounting portion 20 and the second mounting portion 22 move away from each other. The arm biasing member 64 includes a first end 64a and a second end 64b. The first arm body 40 includes a first hole 40a. The second arm body 44 includes a second hole 44a. The first end 64a of the arm biasing member 64 is provided in the first hole 40a of the first arm body 40. The second end 64b of the arm biasing member 64 is provided in the second hole 44a of the second arm body 44. Since the bicycle rim brake 10 further comprises the arm biasing member 64, it is possible to position the first brake arm 12 at the first rest position P31 and to position the second brake arm 14 at the second rest position P41.

As seen in FIG. 1, when the inner wire 6a of the control cable 6 is pulled, the intermediate member 50 pivots relative to the base member 30 about the third pivot axis A3 in a first pivot direction D31. The pivotal cam member 28 pivots together with the intermediate member 50 relative to the base member 30 about the third pivot axis A3 in the first pivot direction D31. This pivotal movement of the pivotal cam member 28 moves the first follower 24 and the second follower 26 away from each other. Thus, the first brake arm 12 pivots relative to the base member 30 about the first pivot axis A1 from the first rest position P31 toward the first operated position P32 (FIG. 4). Similarly, the second brake arm 14 pivots relative to the base member 30 about the second pivot axis A2 from the second rest position P41 toward the second operated position P42 (FIG. 4). The pivotal movement of the first brake arm 12 and the second brake arm 14 causes the first friction member 16 and the second friction member 18 to pinch the bicycle rim 5 (FIG. 1), applying the braking force to the bicycle wheel 4.

When the inner wire 6a of the control cable 6 is released, the biasing force F2 of the arm biasing member 62 (FIG. 7) returns the first friction member 16 to the first rest position P11 and returns the second friction member 18 to the second rest position P21. Thus, the first friction member 16 and the second friction member 18 move away from the bicycle rim 5. At this time, the first follower 24 and the second follower 26 approach each other, causing the pivotal cam member 28 to pivot relative to the base member 30 about the third pivot axis A3 in a second pivot direction D32 opposite to the first pivot direction D31. This respectively returns the pivotal cam member 28 and the intermediate member 50 to initial positions (FIGS. 1 and 4).

With the bicycle rim brake 10, the pivotal cam member 28 is configured to pivot about the third pivot axis A3 which is different from the first pivot axis A1 and the second pivot axis A2 to guide the first follower 24 and the second follower 26 so that the first brake arm 12 pivots about the first pivot axis A1 and the second brake arm 14 pivots about the second pivot axis A2. Thus, it is possible to convert the pivotal movement of the pivotal cam member 28 into the pivotal movement of the first brake arm 12 and the pivotal movement of the second brake arm 14. Accordingly, it is possible to reduce a size of the bicycle rim brake 10 com and/or expand the possibility of design of the bicycle rim brake 10 compared with, for example, a comparative rim brake including a structure configured to convert a linear movement of a cam member into pivotal movements of brake arms.

Furthermore, with the bicycle rim brake 10, the pivotal operating member 28 is configured to pivot about the third pivot axis A3 which is different from the first pivot axis A1 and the second pivot axis A2 so that the first brake arm 12 pivots about the first pivot axis A1 and the second brake arm 14 pivots about the second pivot axis A2. The third pivot axis A3 is provided in an area defined between the first pivot axis A1 and the second pivot axis A2. Thus, it is possible to utilize the area defined between the first pivot axis A1 and the second pivot axis A2. Accordingly, it is possible to further reduce the size of the bicycle rim brake 10 and/or to further expand the possibility of design of the bicycle rim brake 10.

Second Embodiment

A bicycle rim brake 210 in accordance with a second embodiment will be described below referring to FIG. 8. The bicycle rim brake 210 has substantially the same construction as the bicycle rim brake 10 except for the base member 30 and the intermediate member 50. Thus, elements having substantially the same function as those in the first embodiment will be numbered the same here, and will not be described and/or illustrated again in detail here for the sake of brevity.

Figure 8:
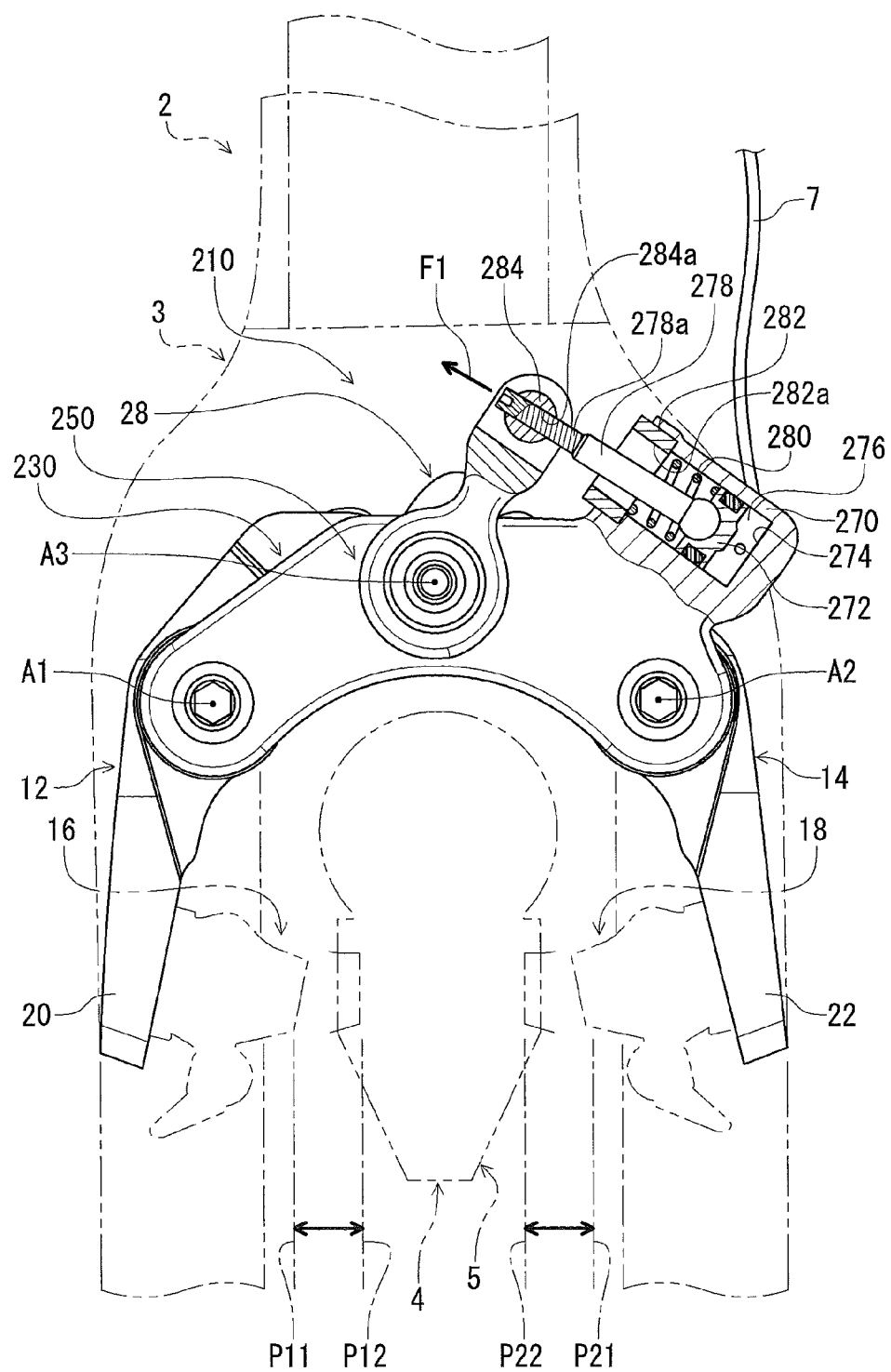
FIG. 8 is an elevational view of a bicycle frame equipped with a bicycle rim brake in accordance with a second embodiment.

As seen in FIG. 8, the bicycle rim brake 10 further comprises a base member 230 to which the first brake arm 12 is pivotally mounted about the first pivot axis A1 and to which the second brake arm 14 is pivotally mounted about the second pivot axis A2. Unlike the base member 30 in accordance with the first embodiment, the outer-casing receiving portion 54 is omitted from the base member 230.

The bicycle rim brake 210 further comprises a hydraulic cylinder 270 and a piston 272. The hydraulic cylinder 270 includes a cylinder bore 274. The piston 272 is movably provided in the cylinder bore 274. In the illustrated embodiment, the hydraulic cylinder 270 is mounted to the base member 230 instead of the outer-casing receiving portion 54 in accordance with the first embodiment. A fluid chamber 276 is defined by the hydraulic cylinder 270 and the piston 272. A fluid chamber 276 is in fluid communication with a master chamber of a brake operating device (not shown) via a hydraulic hose 7. Since the bicycle rim brake 210 comprises the hydraulic cylinder 270 and the piston 272, it is possible to operate the bicycle rim brake 210 via a hydraulic fluid.

As seen in FIG. 8, the bicycle rim brake 210 further comprises an intermediate member 250 via which the operating force F1 is to be transmitted to the pivotal cam member 28. Unlike the intermediate member 50 in accordance with the first embodiment, the cable attachment portion 52 is omitted from the intermediate member 250.

The piston 272 is configured to be coupled to the intermediate member 250. In the illustrated embodiment, the bicycle rim brake 210 further comprises a piston rod 278, a piston biasing member 280, and a stopper 282. The piston rod 278 is operatively coupled to the piston 272. The intermediate member 250 includes a coupling pin 284 having a threaded hole 284a. The piston rod 278 includes a thread bolt 278a. The thread bolt 278a is threadedly engaged with the threaded hole 284a. Rotation of the piston rod 278 changes a distance between the piston 272 and the coupling pin 284, allowing the relative position between the piston 272 and the intermediate member 250 to be adjusted.

Movement of the piston 272 is transmitted to the intermediate member 250 via the piston rod 278 and the coupling pin 284. The piston biasing member 280 is provided in the cylinder bore 274. The stopper 282 is secured to the hydraulic cylinder 270 to support an end of the piston biasing member 280. The stopper 282 has an annular shape. The piston rod 278 extends through an opening 282a of the stopper 282.

With the bicycle rim brake 210, it is possible to obtain substantially the same advantageous effects as those of the bicycle rim brake 10 in accordance with the first embodiment.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rim brake comprising:
   a first brake arm configured to pivot about a first pivot axis and including
      a first mounting portion to which a first friction member is to be mounted, and
      a first follower arranged apart from the first mounting portion;
   a second brake arm configured to pivot about a second pivot axis which is different from the first pivot axis and including
      a second mounting portion to which a second friction member is to be mounted, and
      a second follower arranged apart from the second mounting portion; and
   a pivotal cam member configured to pivot about a third pivot axis which is different from the first pivot axis and the second pivot axis to guide both the first follower and the second follower so that the first brake arm pivots about the first pivot axis and the second brake arm pivots about the second pivot axis,
   wherein the pivotal cam member includes
      a first cam surface configured to guide the first follower, and
      a second cam surface configured to guide the second follower, and
   wherein the first cam surface is provided on an opposite side of the second cam surface relative to the third pivot axis.

2. The bicycle rim brake according to claim 1, wherein the pivotal cam member is provided between the first follower and the second follower.

3. The bicycle rim brake according to claim 1, wherein the third pivot axis is provided between the first follower and the second follower.

4. The bicycle rim brake according to claim 1, wherein the third pivot axis is provided in an area defined between the first pivot axis and the second pivot axis.

5. The bicycle rim brake according to claim 1, wherein the first follower is rotatable about a first rotational axis, and
   the second follower is rotatable about a second rotational axis.

6. The bicycle rim brake according to claim 1, wherein the first follower is provided on an opposite side of the first mounting portion relative to the first pivot axis, and
   the second follower is provided on an opposite side of the second mounting portion relative to the second pivot axis.

7. The bicycle rim brake according to claim 1, further comprising:
   a base member to which the first brake arm is pivotally mounted about the first pivot axis and to which the second brake arm is pivotally mounted about the second pivot axis.

8. The bicycle rim brake according to claim 1, further comprising:
   an intermediate member via which an operating force is to be transmitted to the pivotal cam member.

9. The bicycle rim brake according to claim 8, wherein the intermediate member is configured to be coupled to the pivotal cam member to pivot together with the pivotal cam member about the third pivot axis.

10. The bicycle rim brake according to claim 8, wherein the intermediate member includes a cable attachment portion to which a control cable is to be attached.

11. The bicycle rim brake according to claim 8, further comprising:
a hydraulic cylinder including a cylinder bore; and
a piston movably provided in the cylinder bore, wherein the piston is configured to be coupled to the intermediate member.

12. The bicycle rim brake according to claim 1, further comprising:
a first coupling member configured to couple the first brake arm to a bicycle frame to pivot relative to the bicycle frame about the first pivot axis; and
a second coupling member configured to couple the second brake arm to the bicycle frame to pivot relative to the bicycle frame about the second pivot axis.

13. The bicycle rim brake according to claim 1, wherein the first brake arm includes
a first base part to which the first follower is attached,
a first arm body including the first mounting portion and coupled to the first base part to pivot relative to the first base part about the first pivot axis, and
a first adjuster configured to adjust an orientation of the first arm body relative to the first base part about the first pivot axis.

14. The bicycle rim brake according to claim 13, wherein the second brake arm includes
a second base part to which the second follower is attached,
a second arm body including the second mounting portion and coupled to the second base part to pivot relative to the second base part about the second pivot axis, and
a second adjuster configured to adjust an orientation of the second arm body relative to the second base part about the second pivot axis.

15. The bicycle rim brake according to claim 14, further comprising:
an arm biasing member configured to apply a biasing force to the first arm body and the second arm body so that the first mounting portion and the second mounting portion move away from each other.

16. The bicycle rim brake according to claim 1, further comprising:
an arm biasing member configured to apply a biasing force to the first brake arm and the second brake arm so that the first mounting portion and the second mounting portion move away from each other.

17. The bicycle rim brake according to claim 1, wherein the first brake arm is pivoted from a first rest position to a first operated position and the second brake arm is pivoted from a second rest position to a second operated position by the pivot cam member when the pivot cam member is pivoted about the third pivot axis in a first pivot direction, and
the first brake arm is pivoted from the first operated position to the first rest position and the second brake arm is pivoted from the second operated position to the second rest position by the pivotal cam member when the pivot cam member is pivoted about the third pivot axis in a second pivot direction opposite to the first pivot direction.

18. The bicycle rim brake according to claim 1, wherein the pivotal cam member has a single body including
the first cam surface configured to guide the first follower, and
the second cam surface configured to guide the second follower.

19. A bicycle rim brake comprising:
a first brake arm configured to pivot about a first pivot axis and including
a first mounting portion to which a first friction member is to be mounted, and
a first follower arranged apart from the first mounting portion;
a second brake arm configured to pivot about a second pivot axis which is different from the first pivot axis and including
a second mounting portion to which a second friction member is to be mounted, and
a second follower arranged apart from the second mounting portion; and
a pivotal cam member configured to pivot about a third pivot axis which is different from the first pivot axis and the second pivot axis to guide both the first follower and the second follower so that the first brake arm pivots about the first pivot axis and the second brake arm pivots about the second pivot axis,
wherein the pivotal cam member includes
a first cam surface configured to guide the first follower, and
a second cam surface configured to guide the second follower, and
wherein the first cam surface has a profile different from a profile of the second cam surface.

20. A bicycle rim brake comprising:
a first brake arm configured to pivot about a first pivot axis and including a first mounting portion to which a first friction member is to be mounted;
a second brake arm configured to pivot about a second pivot axis which is different from the first pivot axis and including a second mounting portion to which a second friction member is to be mounted; and
a pivotal operating member configured to pivot about a third pivot axis which is different from the first pivot axis and the second pivot axis to guide both the first brake arm to pivot about the first pivot axis and the second brake arm to pivot about the second pivot axis, the third pivot axis being provided in an area defined between the first pivot axis and the second pivot axis,
wherein the third pivot axis is parallel to the first pivot axis and the second pivot axis.

21. The bicycle rim brake according to claim 20, wherein the first brake arm is pivoted from a first rest position to a first operated position and the second brake arm is pivoted from a second rest position to a second operated position when the pivot cam member is pivoted about the third pivot axis in a first pivot direction, and
the first brake arm is pivoted from the first operated position to the first rest position and the second brake arm is pivoted from the second operated position to the second rest position when the pivotal cam member is pivoted about the third pivot axis in a second pivot direction opposite to the first pivot direction.

22. The bicycle rim brake according to claim 20, wherein the pivotal cam member has a single body including
a first cam surface configured to guide the first follower, and
a second cam surface configured to guide the second follower.

23. The bicycle rim brake according to claim 20, wherein the first brake arm is pivoted from a first rest position to a first operated position and the second brake arm is pivoted from a second rest position to a second operated position by the pivotal operating member when the pivotal operating member is pivoted about the third pivot axis in a first pivot direction, and the first brake arm is pivoted from the first operated position to the first rest position and the second brake arm is pivoted from the second operated position to the second rest position by the pivotal operating member when the pivotal operating member is pivoted about the third pivot axis in a second pivot direction opposite to the first pivot direction.

24. The bicycle rim brake according to claim 20, wherein the pivotal operating member has a single body including a first cam surface configured to guide a first follower of the first brake arm, and a second cam surface configured to guide a second follower of the second brake arm.

25. The bicycle rim brake according to claim 20, wherein the pivotal operating member has a single body to guide the first brake arm and the second brake arm so that the first brake arm pivots about the first pivot axis and the second brake arm pivots about the second pivot axis.

26. The bicycle rim brake according to claim 20, wherein the pivotal operating member configured to pivot about a single third pivot axis to guide the first brake arm and the second brake arm so that the first brake arm pivots about the first pivot axis and the second brake arm pivots about the second pivot axis.

* * * * *